United States Patent
Wang et al.

(10) Patent No.: US 6,184,939 B1
(45) Date of Patent: Feb. 6, 2001

(54) APPARATUS FOR PROCESSING VIDEO SIGNALS AND EMPLOYING PHASE-LOCKED LOOP

(75) Inventors: Shin-Su Wang, Taipei; Wen-Chin Cheng, MiaoLi; Shih-Hsun Lin, Tao Yuan, all of (TW)

(73) Assignee: Umax Data Systems Inc., Hsinchu (TW)

( * ) Notice: Under 35 U.S.C. 154(b), the term of this patent shall be extended for 0 days.

(21) Appl. No.: 09/207,615

(22) Filed: Dec. 9, 1998

(51) Int. Cl.[7] ................................ H04N 5/21; H04N 9/78
(52) U.S. Cl. ........................... 348/625; 348/537; 348/665
(58) Field of Search ............................... 348/510, 536, 348/537, 625, 539, 630, 637, 663, 665, 667, 645, 673, 678, 679, 687; H04N 9/475, 5/21, 9/78

(56) References Cited

U.S. PATENT DOCUMENTS 4,415,918  *  11/1983  Lewis, Jr. .
4,506,291  *  3/1985   Lewis, Jr. .
5,175,619  *  12/1992  Willis .
5,870,153  *  2/1999   Murray ................................. 348/667

FOREIGN PATENT DOCUMENTS 6-261224  *  9/1994  (JP) .

* cited by examiner

*Primary Examiner*—Sherrie Hsia
(74) *Attorney, Agent, or Firm*—Dougherty & Troxell (57) ABSTRACT

Apparatus for processing video signals and which can be connected with a personal computer for further processing. An analog to digital converter samples and converts input NTSC composite video signal into digital signal for subsequent processing. A phase-locked loop provides sampling clock signal to the ADC, and also ensures accurate sample phase. Based on a theory that human eye is more sensitive to the luminance component of video signals, a double sampling circuit is included which double samples the luminance component of a video signal to improve the overall resolution of an image.

15 Claims, 13 Drawing Sheets

| Absolute Value of Phase Difference ($\|n2-n0\|$) | Control Value of Voltage-Controlled Oscillator (3-bit) |
|---|---|
| 0,1 | 高阻抗 |
| 2,3 | 011 / 100 |
| 4,5 | 010 / 101 |
| 6,7 | 001 / 110 |
| 8,9,10,11,....->255 | 000 / 111 |

| Horizontal Scanning Line | | | | | | |
|---|---|---|---|---|---|---|
| m−2 | y−u | y−v | y+u | y+v | y−u | y−v |
| m−1 | y+v | y+u | y−v | y−u | y+v | y+u |
| m | y+u | y+v | y−u | y−v | y+u | y+v |
| m+1 | y−v | y−u | y+v | y+u | y−v | y−u |
| m+2 | y−u | y−v | y+u | y+v | y−u | y−v |

FIG.12

| Horizontal Scanning Line | | | | | | |
|---|---|---|---|---|---|---|
| m−2 | y+u | y+v | y−u | y−v | y+u | y+v |
| m−1 | y−v | y−u | y+v | y+u | y−v | y−u |
| m | y−u | y−v | y+u | y+v | y−v | y−v |
| m+1 | y+v | y+u | y−v | y−u | y+v | y+u |
| m+2 | y+u | y+v | y−u | y−v | y+u | y+v |

APPARATUS FOR PROCESSING VIDEO SIGNALS AND EMPLOYING PHASE-LOCKED LOOP

FIELD OF THE INVENTION

This invention relates to apparatus for processing video signals and and more particularly to an apparatus which employs phase-locked loop and analog to digital conversion to obtain high quality static image.

BACKGROUND OF THE INVENTION

Video signals processed by a conventional apparatus, when redisplay on a monitor connected to a computer system, suffer several problems, such as false color at the edge of an image. Additionally, too high hardware cost inevitably lower the competitiveness of the apparatus. Another drawback of a conventional video signal processing apparatus lies in its comb filter. Conventional comb filters process video signals which are sampled on two adjacent horizontal scanning lines, without considering the resolution of vertical direction. The resolution of processed images is thus scarified.

H. Hagino, etc. in U.S. Pat. No. 5,523,798 describe a circuit for adjusting signal separation in Y/C separation comb filter by hardware connecting a phase-locked loop to a burst gate pulse generation circuit and multipliers. This greatly increases hardware costs. In addition, in separating a luminance signal and a chrominance signal, the comb filter of U.S. Pat. No. 5,523,798 takes only two dimensions into consideration. As a result of such two dimensional processing, the image processed suffers from false color and low resolution. Stuart S. Perlnan in U.S. Pat. No. 4,961,108 describes a circuit for comb filtering PAL and NTSC video signals. The comb filter of U.S. Pat. No. 4,961,108 also takes only two dimensions into consideration in processing video signals. Therefore, the problems of false color and low resolution can not be avoided.

SUMMARY OF THE INVENTION

It is therefore an object of the invention to provide an apparatus for processing video signals by means of employing phase-locked loop in combination of the technology of analog to digital conversion.

It is another object of the invention to provide an apparatus for processing video signals which can effectively increase the quality of captured static images without increasing costs.

It is yet another object of the present invention to provide an apparatus for processing video signals which can effectively lower hardware costs and increase competitiveness of the product.

It is still another object of the present invention to provide an apparatus for processing video signals and apparatus thereof, which double samples the captured static images and therefore increases the overall resolution of the captured images.

DETAILED DESCRIPTION OF THE PREFERRED EMBODIMENTS

Figure 1:
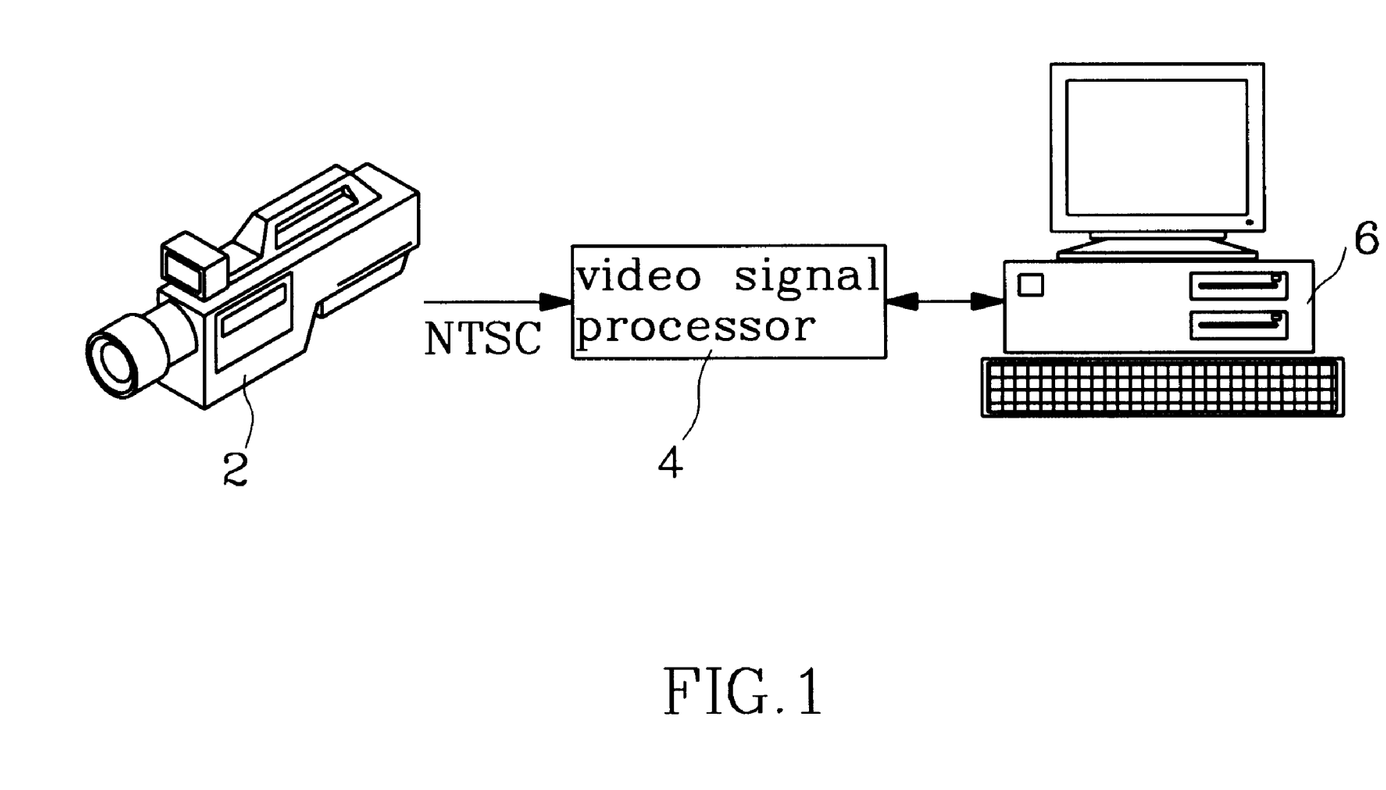
FIG. 1 is a pictorial diagram represent a configuration of the present invention.

This invention describes an apparatus for processing video signals and which can be connected with a personal computer for further processing. Referring to FIG. 1 where the invention is coupled to a NTSC video camera 2, or a camcorder, etc., at the input end. The output end of the video signal processing apparatus 4 is connected to a personal computer 6 through a printer port interface. The video signal which is first processed by the invention can be further edited by the personal computer 6 using some other software, such as Photoshop, or can be transmitted to a remote host through a network.

Figure 2:
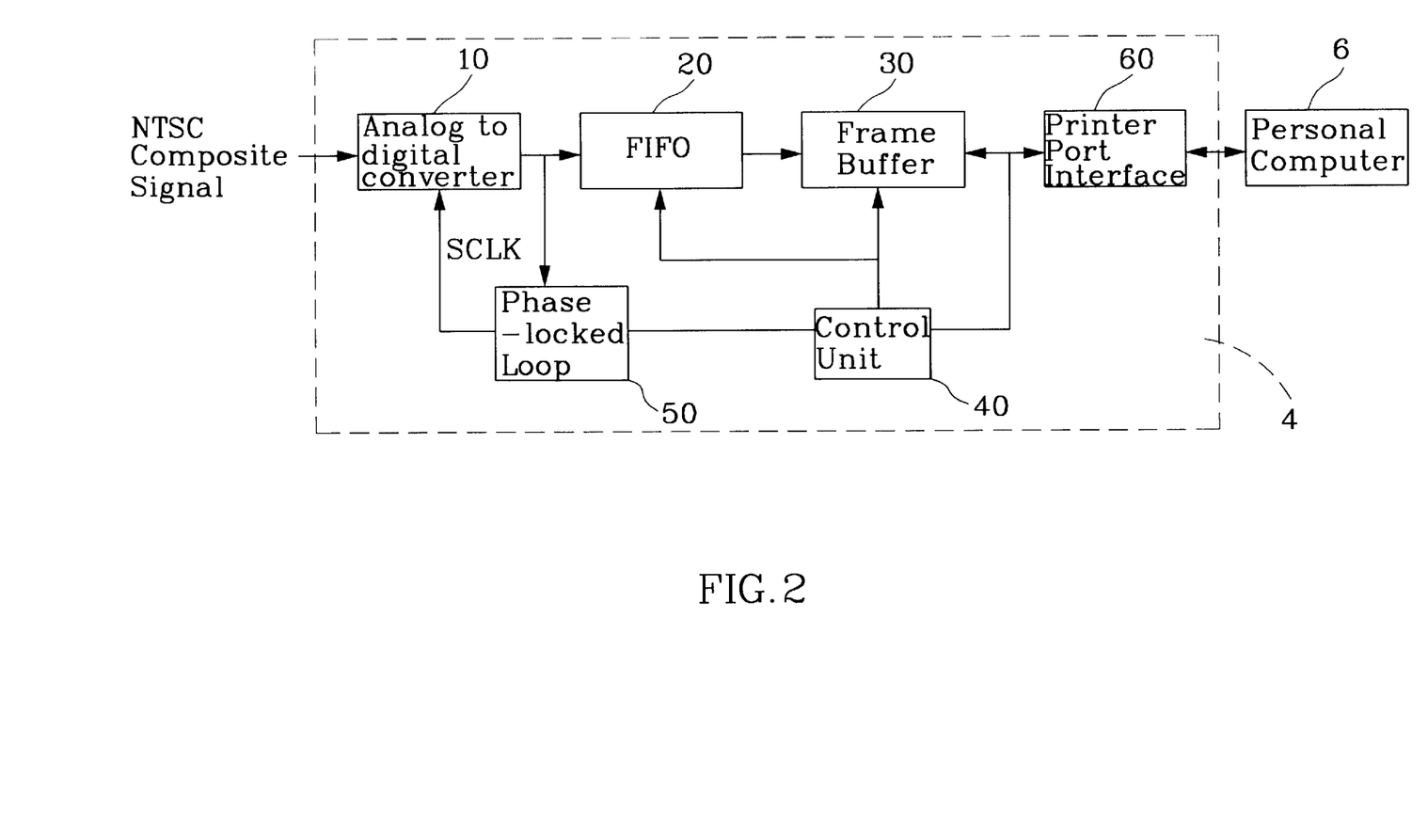
FIG. 2 is a block diagram of an implementation of the invention.

FIG. 2 illustrates circuitry embodying the basic invention. Input NTSC composite video signal which may be sourced from an NTSC video camera 2 of FIG. 1 is applied to the analog input connection of an analog to digital converter (ADC) 10 for sampling and converting the video signal into an digital signal. The digital video signal is represented in an 8-bit binary form. ADC 10 samples the transmitted analog video signal at a specific frequency, which may be as high as 14.318 MHz, according to a sampling clock signal (SCLK). SCLK is provided by a phase-locked-loop (PLL) 50. PLL 50 develops the clock signal (SCLK) which has a frequency of four times the color burst subcarrier frequency $f_{sc}$, and is in phase with the phase of the color burst signal. The digital signal supplied by ADC 10 is sequentially stored in a first-in-first-out buffer (FIFO) 20 first, before it is transmitted to a frame buffer 30. As the data rate of ADC 10 is higher than that of frame buffer 30, the output signal of ADC 10 is buffered in FIFO 20. Frame buffer 30 provides a compensating delay to the digital video signal generated by ADC 10, to accommodate for processing delay of frame buffer 30.

Frame buffer 30 is partitioned into multiple fields for temporarily storing the digital video signal provided by ADC 10. The memory size of frame buffer 30 can be predetermined by users according to its intended applications. The connection between FIFO 20 and frame buffer 30 is controlled by a control unit 40. Control unit 40, which comprises multiple control registers and multiple status registers (not shown in FIG. 2), also provides timing for the operations of FIFO 20 and frame buffer 30. In addition, control unit 40 also determines the phase of sampling clock signal (SCLK) which is outputted by PLL 50 and coupled to ADC 10. The output terminal of frame buffer 30 is connected to a printer port interface 60 of a personal computer 6 through which the video signal and control signal are transmitted to personal computer 6 for further processing.

Figure 3:
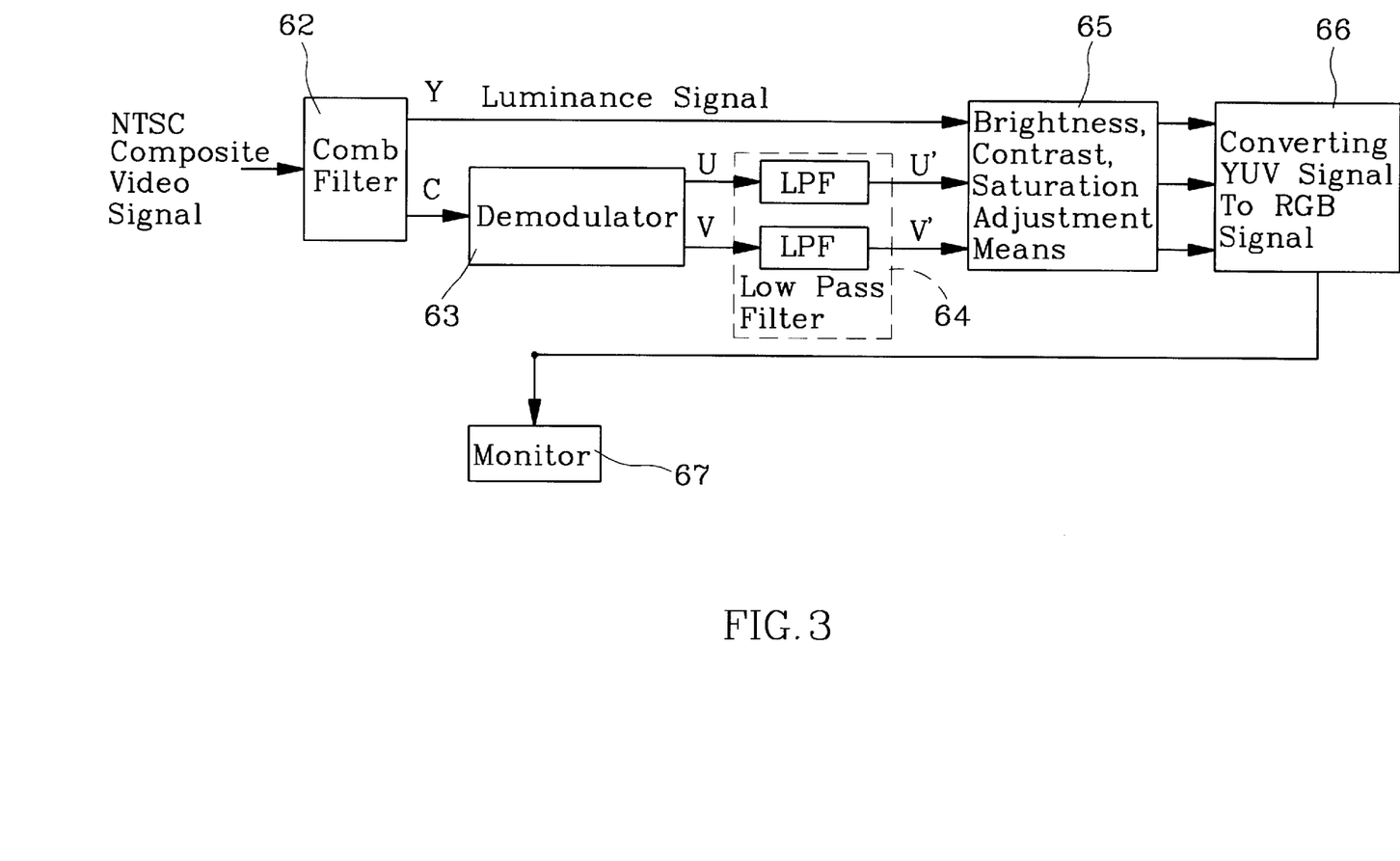
FIG. 3 is a block diagram showing the processing of video signal employing the circuit of the invention.

The video signal processing flow of the circuit of the invention is illustrated in FIG. 3. After the image capture is activated, an analog NTSC composite video signal is converted to a digital NTSC composite video signal by analog to digital converter 10. The digital NTSC composite video signal is stored in frame buffer 30. Personal computer is supplied with the digital NTSC composite video signal for decoding through printer port interface 60.

Figure 11:
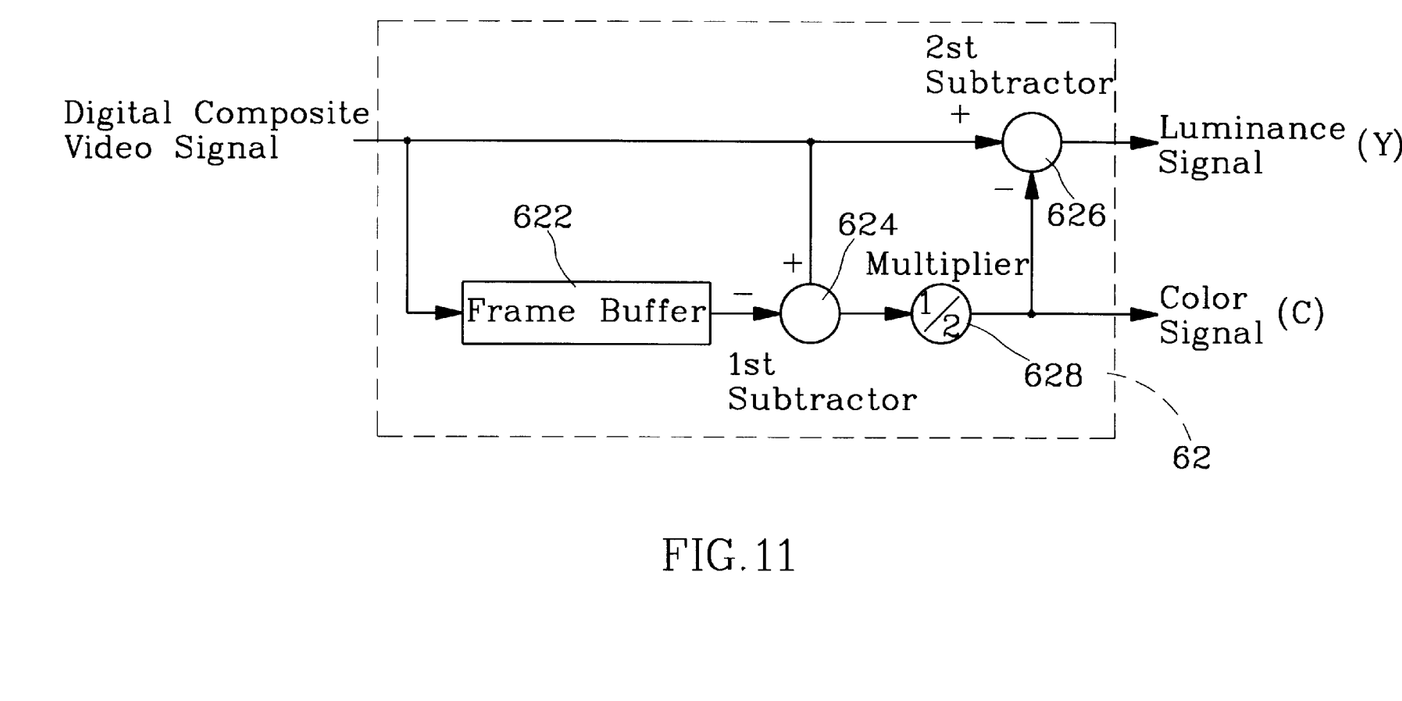
FIG. 11 is a block diagram showing a comb filter embodying the invention.

The digital video signal provided by ADC 10 is fed to a YC separation circuit through printer port interface 60, for being separated into a luminance (Y) signal and a chrominance (C) signal by means of a comb filter 62. It is well known that a NTSC chrominance signal is the signal sampled in phase with one of the axes of the quadrature modulated color difference signal components U, V. By convention component U represents the (B-Y) color difference signal and component V represents the (R-Y) color difference signal. Chrominance signal (C) can be represented by the equation:

$$C = U\cos(t) + V\sin(t)$$

where sin(t) and cos(t) are the color subcarriers which have a frequency of 3.58 MHz. Color difference signals U and V are obtained by means of demodulating chrominance signal through a demodulator 63. Demodulator 63 is connected to a low pass filter 64 for limiting the amplitude of color difference signal U and V to a predetermined range. Both the luminance signal and chrominance signal provided by low pass filter 64 are fed to a adjustment means 65 for brightness, contrast, and color saturation adjustment. As the monitor 67 of personal computer 6 processing video signal in terms of RGB signal which represent Red, Green, and Blue, the luminance signal as at 66 (Y) and chrominance signal (U and V) need to be converted to RGB signal before an image representing the video signal can be displayed on monitor 67. Comb filter 62 is an important element of this invention, and will be described in detail in FIG. 11.

Figure 4:
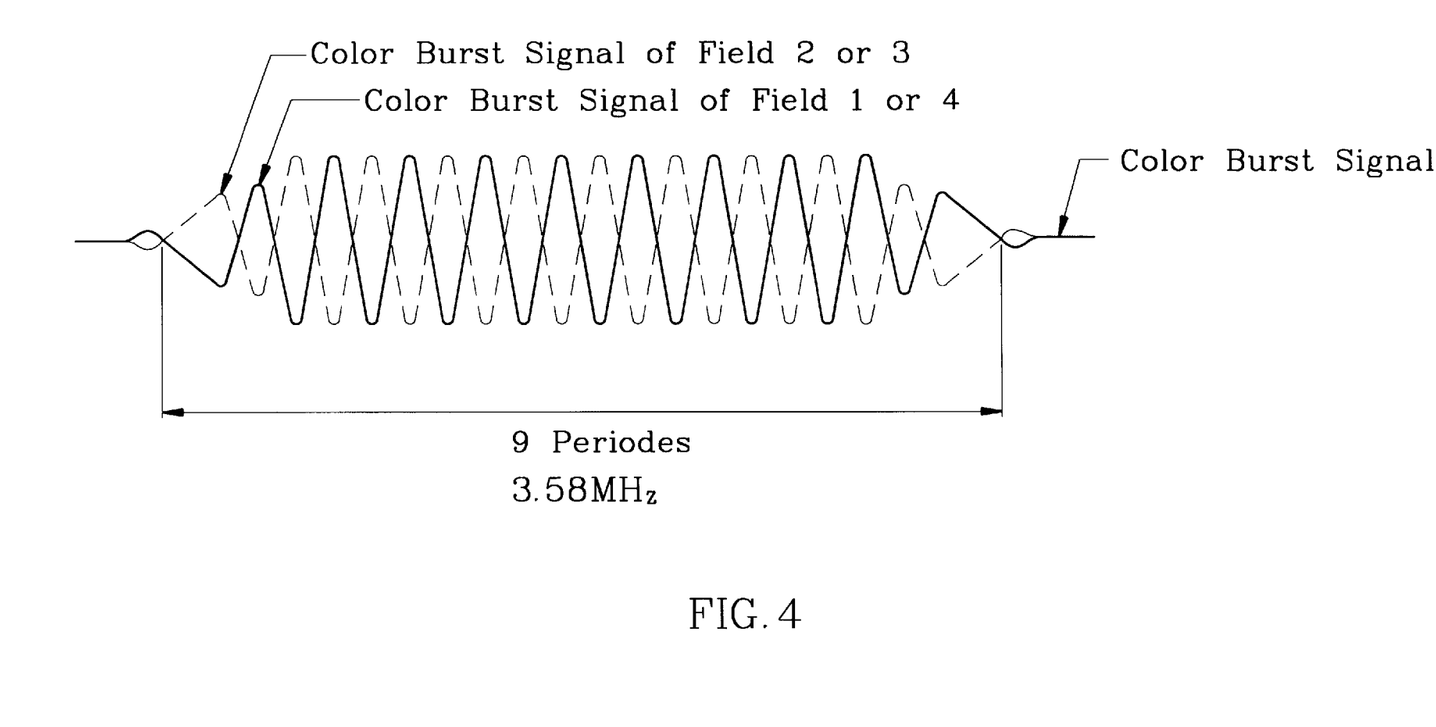
FIG. 4 is the waveform of a color burst signal.

It is well known to those skilled in the art of video signal processing that an NTSC composite video signal is interposed with a color burst signal having a subcarrier frequency of 3.58 MHz. FIG. 4 shows a sample waveform of a color burst signal samples in 9 periods. The color burst signal has the same frequency as that of chrominance signal (C), but has a different position along a horizontal scan line. It has been mentioned that chrominance signal (C) can be represented by the equation:

$$C = U\cos(t) + V\sin(t) = \sqrt{U^2 + V^2}$$

where $\sqrt{U^2 + V^2}$ represents the amplitude of chrominance signal (C), and determines the color saturation. Cos(t) and sin(t) are the phase difference with respect to color burst signal, and determine the color hue. When t falls in 0°, 90°, 180°, and 270°, the values of C can be obtained as:

$t=0°, C=U$
$t=90°, C=V$
$t=180°, C=-U$
$t=270°, C=-V$

The obtained C, which can be either U or V, are the demodulation of color difference C. The phase-locked loop 50 of this invention can accurately generates a sampling frequency which is 4 times of 3.58 MHz, and the phases of samples are 0°, 90°, 180°, or 270°.

Figure 5:
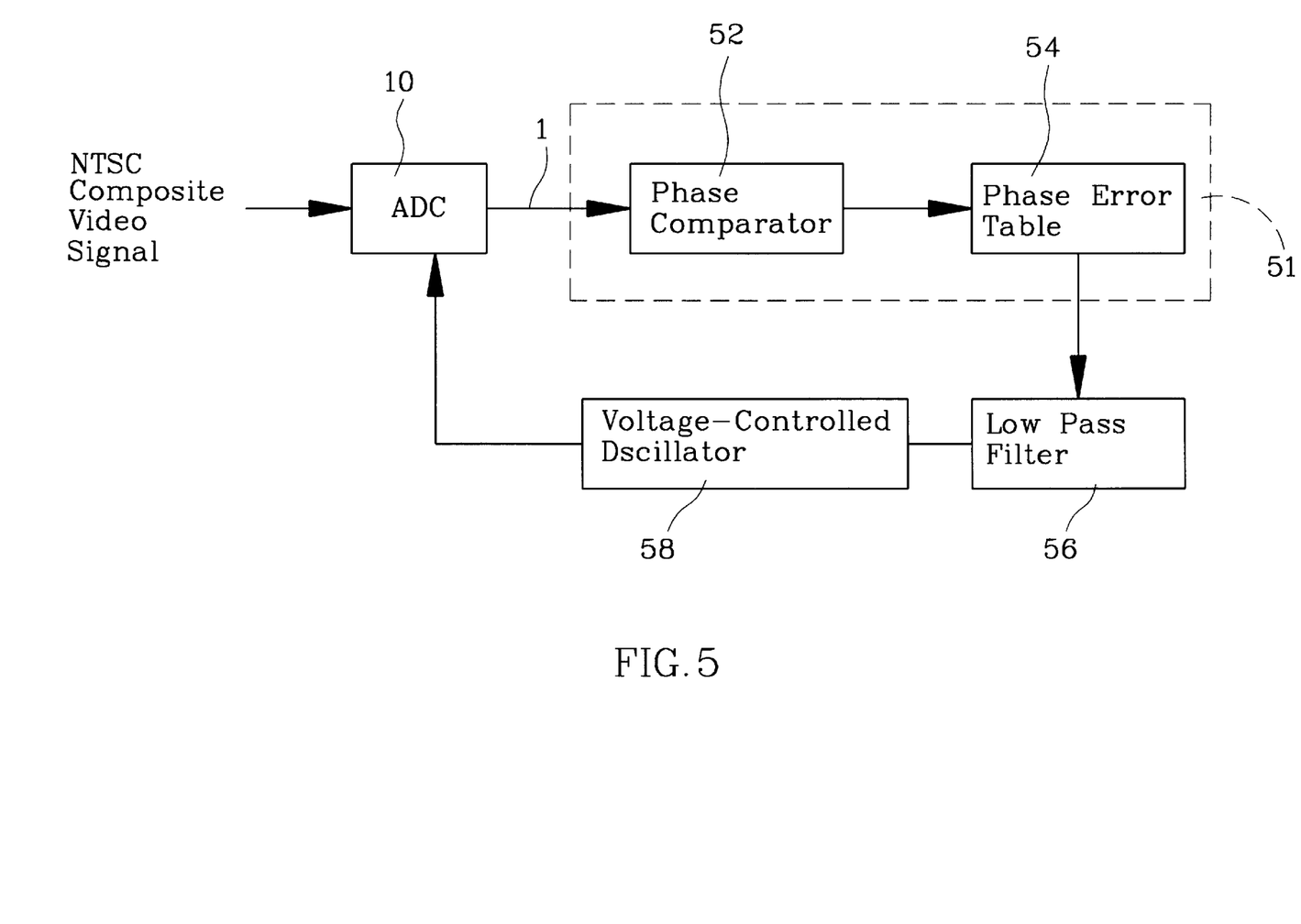
FIG. 5 is a block diagram of a phase-locked loop embodying the invention.

FIG. 5 shows a configuration of a phase-locked-loop (PLL) according to the present invention, and the connection to other elements of the present invention. PLL 51 includes a phase comparator 52 and a phase error table 54. The digital video signal supplied by ADC 10 is coupled to phase comparator 52. Phase comparator 52, which corresponds to the supply of the color burst signal, compares the phases of a sequence of video signals. The comparison result is supplied to phase error table 54 for determining probable occurrences of errors in the input signal and in turn generates an error signal. The output end of phase error table 54 is coupled to a low pass filter 56 for a smoothed signal. The output of low pass filter 56 is supplied to a cascaded connected voltage-controlled oscillator 58 and ADC 10 for analog to digital conversion.

Figure 6:
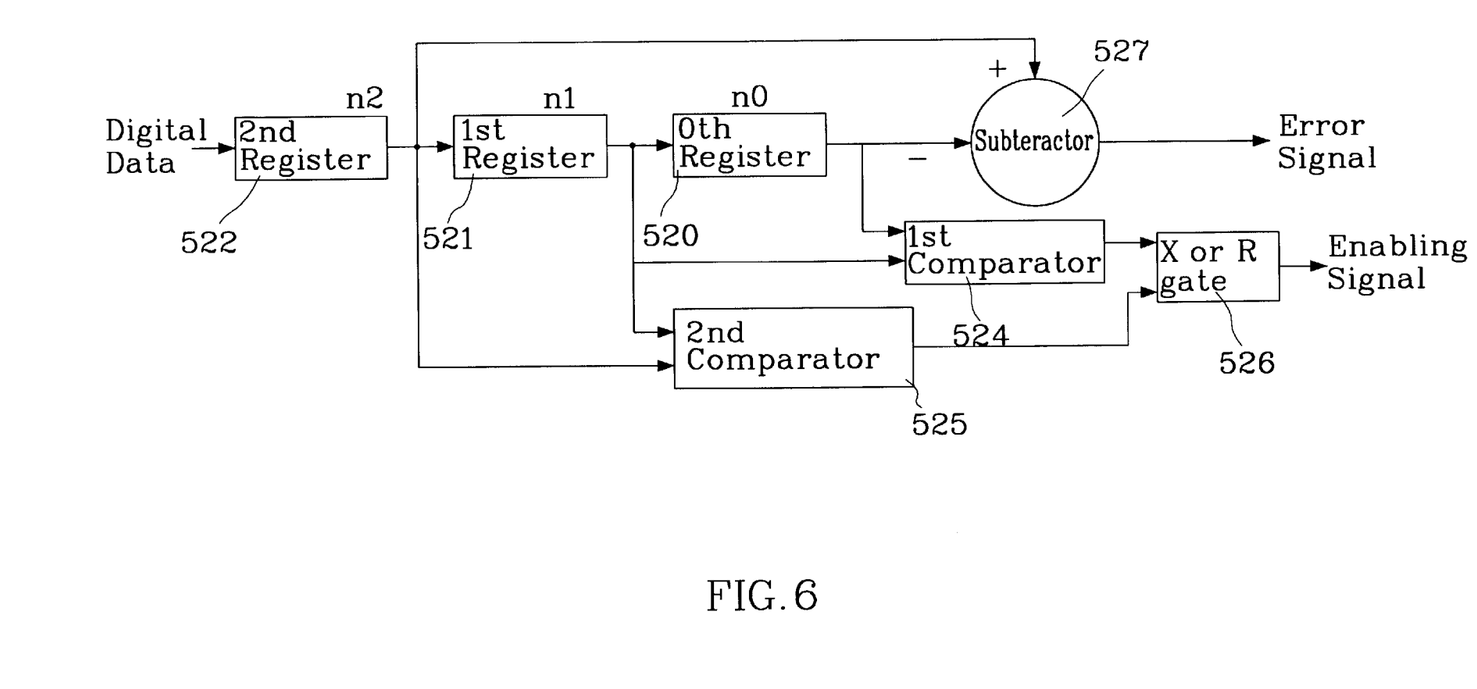
FIG. 6 is a block diagram of a phase comparator of the phase-locked loop shown in FIG. 5.

FIG. 6 shows a block diagram of the phase comparator 52 of the present invention. Phase comparator 52 includes a $2^{nd}$ register 522, a $1^{st}$ register 521, and a $0^{th}$ register 520 for storing a sequence of three video signals representing three samples transmitted from ADC 10. The outputs of $2^{nd}$ register 522, $1^{st}$ register 521, and $0^{th}$ register 520 are designated as n2, n1 and n0 respectively. The minuend input terminal of a subtracter 527 is coupled to receive n2 signal from $2^{nd}$ register 522, and subtrahend input terminal to receive n0 signal from $0^{th}$ register 520. Subtracter 527 performs the arithmetic operation of subtraction by subtracting n0 from n2. An error signal (Error) representing the difference between the $1^{st}$ signal and the $3^{rd}$ signal of a sequence is generated by subtracter 527 and coupled to phase error table 54. Phase comparator 52 further includes a $1^{st}$ comparator 524 for comparing the phases of n0 and n1, and a $2^{nd}$ comparator 525 for comparing the phases of n1 and n2. The comparison results of $1^{st}$ comparator 524 and $2^{nd}$ comparator 525 are coupled to respective input terminals of an exclusive OR circuit (XOR) 526 which produces a enabling signal (EN). The enabling signal controls the output of error signal (Error).

Figure 7:
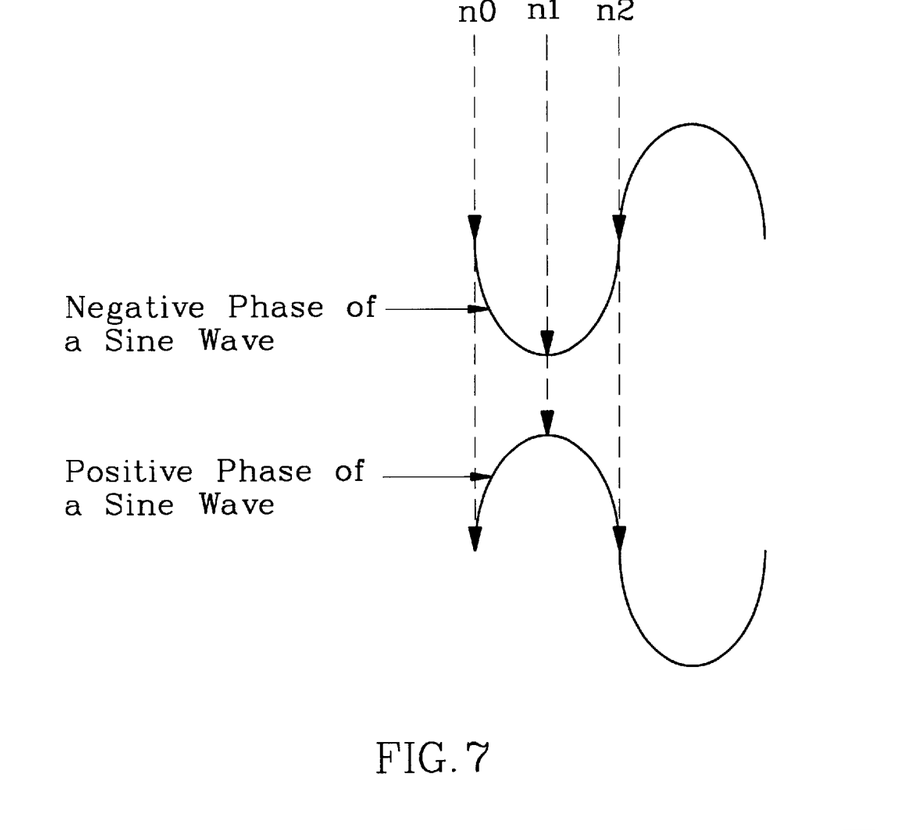
FIG. 7 is a waveform for comparing the positive and negative phases of the sine wave of color burst signal.

FIG. 7 shows a waveform of a color burst signal with positive phase and negative phase, for the purpose of explaining the relationship between the result of phase comparison and sampling frequency. There exist two conditions in the phase comparison result and sampling frequency:

Condition I: (when n1<n0 and n1<n2, the waveform is in negative phase)

a. If n2>n0, the phase of sampling clock signal lags, and the sampling frequency is to be increased.

b. If n2<n0, the phase of sampling clock signal leads, and the sampling frequency is to be decreased.

Condition II: (when n1>n0 and n1>n2, the waveform is in positive phase)

a. If n2>n0, the phase of sampling clock signal leads, and the sampling frequency is to be decreased.

b. If n2<n0, the phase of sampling clock signal lags, and the sampling frequency is to be increased.

Under Condition I or Condition II exclusively, the output of exclusive OR circuit (XOR) 526, EN is set to high to enable the transfer of Error signal from subtracter 527 to phase error table 54.

Figure 8:
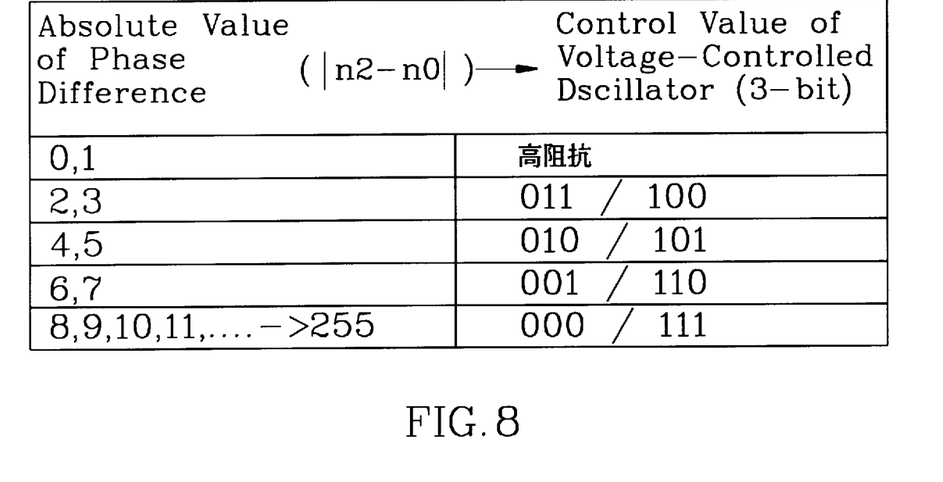
FIG. 8 is a phase error table embodying the invention.

In one embodiment of this invention, the error signal representing the phase difference of signals n0 and n2 is generated by subtracter 527 in 8 bits. The value of the phase difference ranges from 0 to 255 in decimal. However voltage-controlled oscillator 58 responds to a 3-bit signal. Phase error table 54 is established in between the phase comparator 52 and voltage-controlled oscillator 58 to transform the 8-bit signal of phase difference into corresponding 3-bit control signal. FIG. 8 shows an embodiment of phase error table 54 according to this invention. In FIG. 8, when the absolute value of n2-n0 (ABS(n2-n0)) is either 0 or 1, the output control value of voltage-controlled oscillator 58 is set to high impedance; in the case of 4 or 5, output control value "101," and in the case of −4 or −5, output control value "010."

Figure 9:
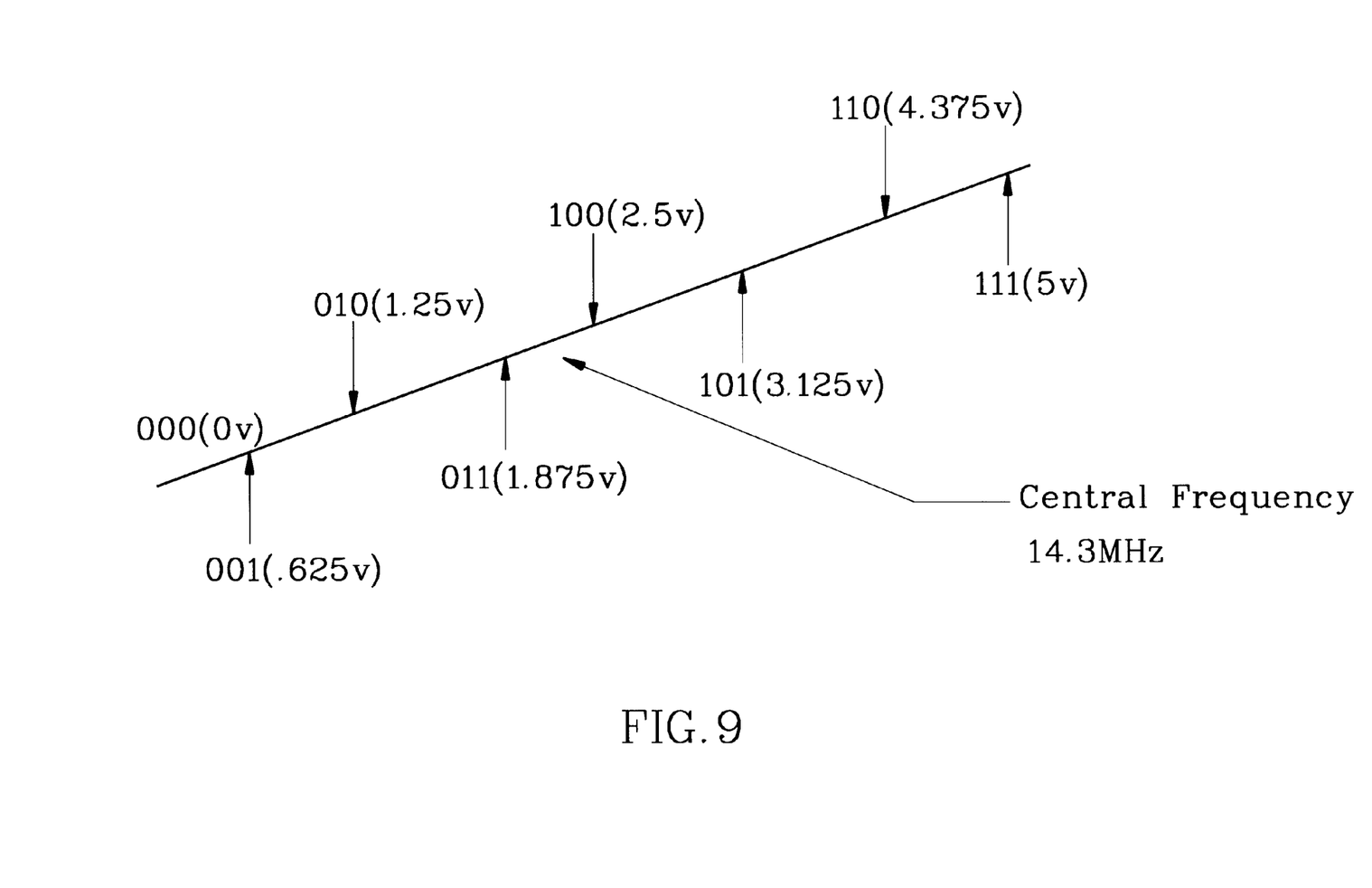
FIG. 9 is a block diagram showing the digital to analog conversion of the low pass filter of the phase-locked loop according to the invention.

Referring to FIG. 5, the output of phase error table 54 is coupled to low pass filter 56 for a smoothed signal. A digital to analog conversion according to FIG. 9 is first applied to the output signal of phase error table 54 before the signal can be accepted by low pass filter 56 for further processing. FIG. 9 shows the conversion of a 3-bit digital signal, ranging from "000" to "111," with central frequency of 14.318 MHz, to an analog signal ranging from 0 V to 5 V. The central frequency of 14.318 MHz corresponds to the high impedance of FIG. 8, with analog voltage signal around 2.2 V. According to FIG. 9, if the input voltage of voltage-controlled oscillator 58 is greater than 2.2 V of the 14.318 MHz central frequency, the output frequency of voltage-controlled oscillator 58 is higher than the central frequency, i.e. 14.318 MHz. Conversely, if the input voltage of voltage-controlled oscillator 58 is smaller than 2.2 V, the output frequency of voltage-controlled oscillator 58 will be lower than 14.318 MHz. For the purpose of digital to analog conversion, a digital to analog converter constructed with a resister matrix in a conventional way can be employed. In addition, low pass filter 56 of FIG. 5 integrates the input voltages to reduce the ripple component and generates an output voltage-controlled oscillator 58.

Figure 10:
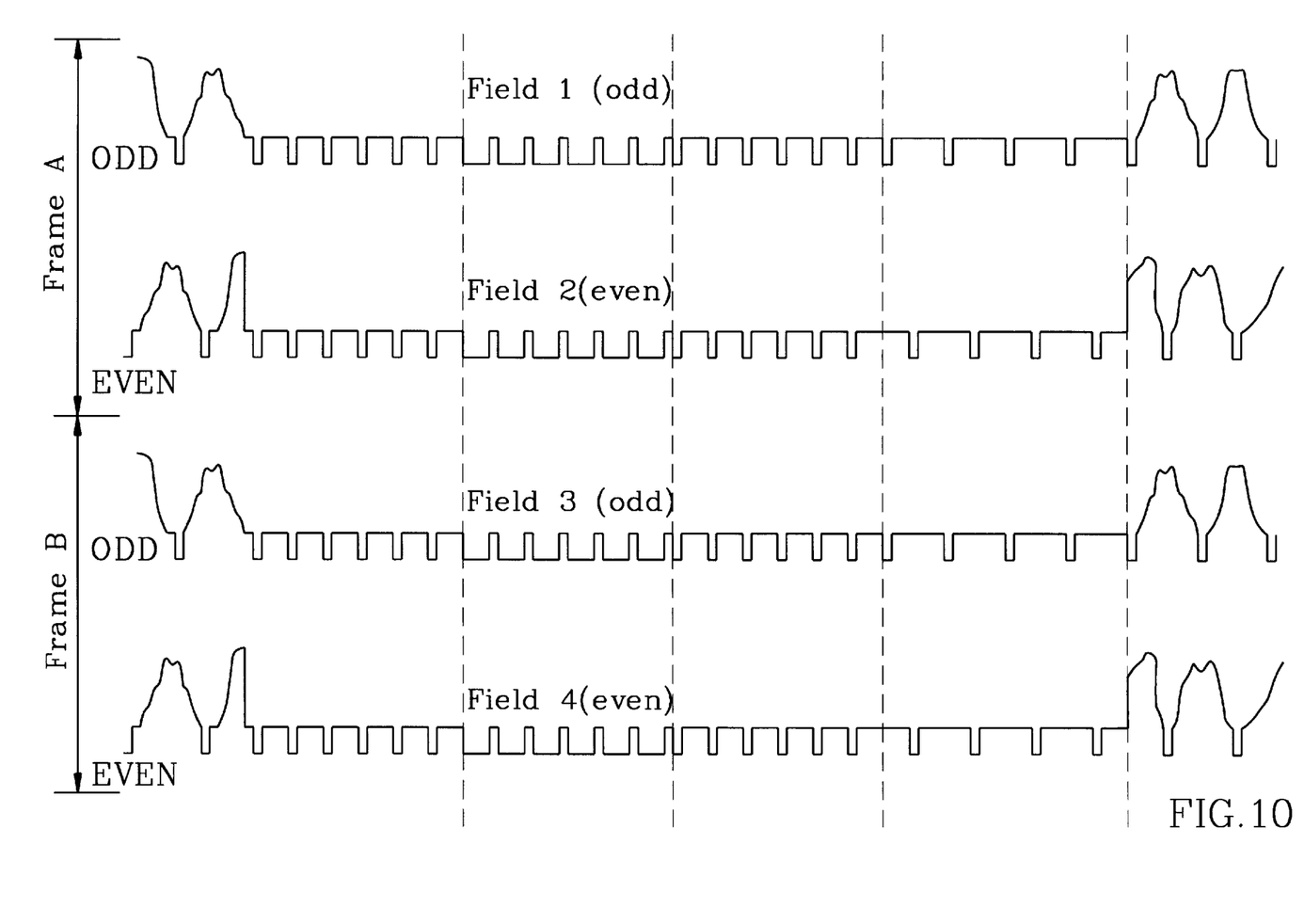
FIG. 10 is a waveform showing the 180° phase shift of two adjacent even fields or two odd fields of the subcarrier of a color burst signal.

According to NTSC, a video frame is composed of an odd field and an even field. FIG. 10 shows a pictorial representation of a NTSC video frame signal. The two phases of the color sub-carriers of two adjacent odd fields or two adjacent even fields are opposite to each other; i.e. one phase is 180 degrees off another phase.

FIG. 10 illustrates a video frame A which is composed of field 1 and field 2, and a video frame B of field 3 and field 4. Field 1 and field 3 are designated as odd fields, and field 2 and field 4 as even fields. While in a displayed image the scanning lines of field 1 and field 3 are at the same location, the phases of color sub-carriers of field 1 and field 3 are 180 degrees off each other. For the purpose of processing video signal by a comb filter in a three-dimensional way, a time domain is added into the processing in addition to conventional X axis and Y axis of an image. A conventional comb filter samples the video signal of two adjacent scanning lines without considering the resolution of the vertical direction, and is therefore can not avoid the problem of false color at the edge of an image.

Figure 12:
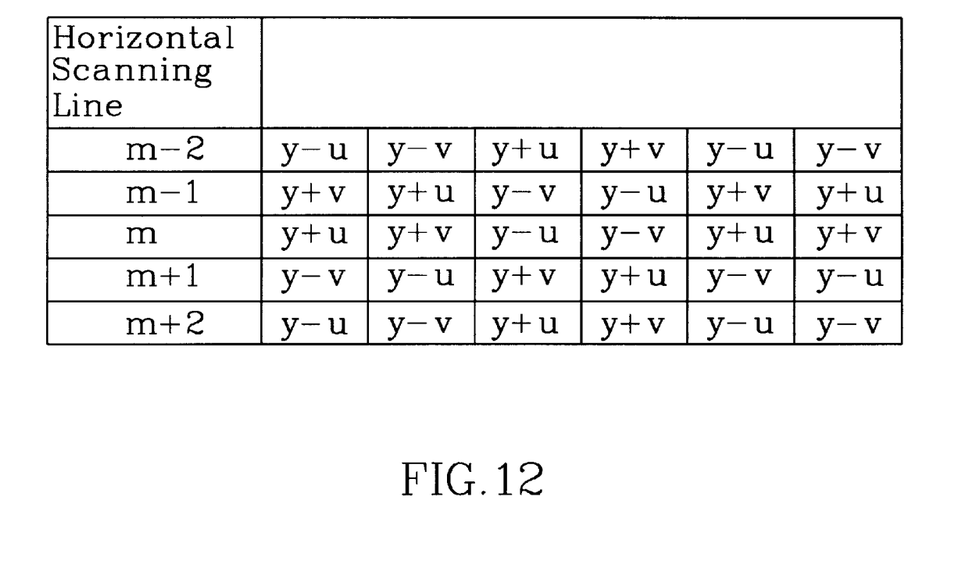
FIG. 12 is a pictorial diagram representing a portion of a field of video signal sampled on a horizontal line and stored in a frame buffer of a comb filter embodying the invention.
Figure 13:
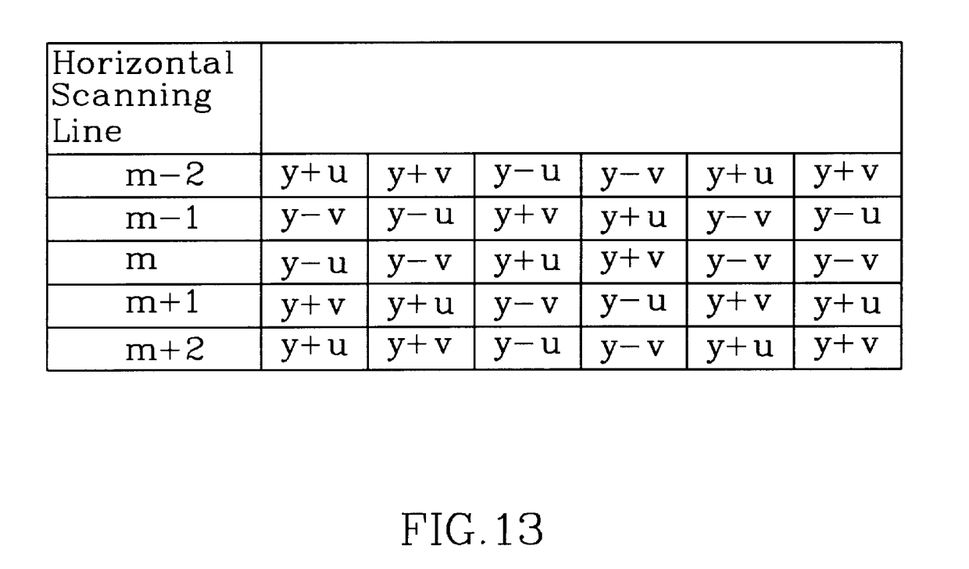
FIG. 13 is a pictorial diagram representing a subcarrier with 180° phase shift from the samples of FIG. 12.

FIG. 11 shows the functional block of an embodiment of comb filter 62 according to the present invention, and its connection to peripheral elements. The detail operation of comb filter 62 is described as follows. A NTSC composite video signal, phase locked by PLL 50 and converted by ADC 10 to a digital signal, is supplied to a frame buffer 622. The samples of a composite video signal stored in frame buffer 622 are arranged in a matrix form, as shown in FIG. 12. FIG. 12 illustrates a matrix of video signal samples representing successive chrominance and luminance components from portions of successive horizontal lines of a NTSC video signal. By convention component Y represents the luminance contribution, and components U and V represent (B-Y) and (R-Y) color difference signals respectively. FIG. 13 shows the sample distribution of a static image resulting from sampling the video signal of adjacent frame at the same location. The data of FIG. 13 shows the characteristic of 180 degrees off the phases of chrominance components of FIG. 12.

The operation of separating a luminance signal and a chrominance signal from a video signal by means of comb filter 62 is described in reference to FIG. 11, FIG. 12, and FIG. 13. Every element of the matrix in FIG. 13 is subtracted by the element of the matrix of FIG. 12 located at the same location through a $1^{st}$ subtracter 624. The resulting difference is multiplied by ½ by means of a multiplier 628. The output of multiplier 628 represents the color difference (U or V) of every pixel of the sampled video signal. The chrominance component, the C term, of each sampled data in FIG. 13 is eliminated through a $2^{nd}$ subtracter 626. The output of the $2^{nd}$ subtracter 626 is the luminance component, the Y term, of the video signal. To apply a composite video signal to comb filter 62 of FIG. 11 for Y/C separation, a pixel of the current video frame is defined as m, and that of the previous frame as n. The color signal C is obtained by plugging in m and n to the formula: $(m-n) \div 2 = C$. The luminance signal is obtained by applying the formula: $n - C = Y$. The Y/C separation is thus achieved by the circuit shown in FIG. 11 embodied the comb filter of this invention.

According to a study that human eyes are more sensitive to the luminance component of a video signal than to the chrominance component. It therefore to doubling the sampling of the luminance component of a video signal, the Y contribution, can greatly increase the resolution of a static image.

Figure 14:
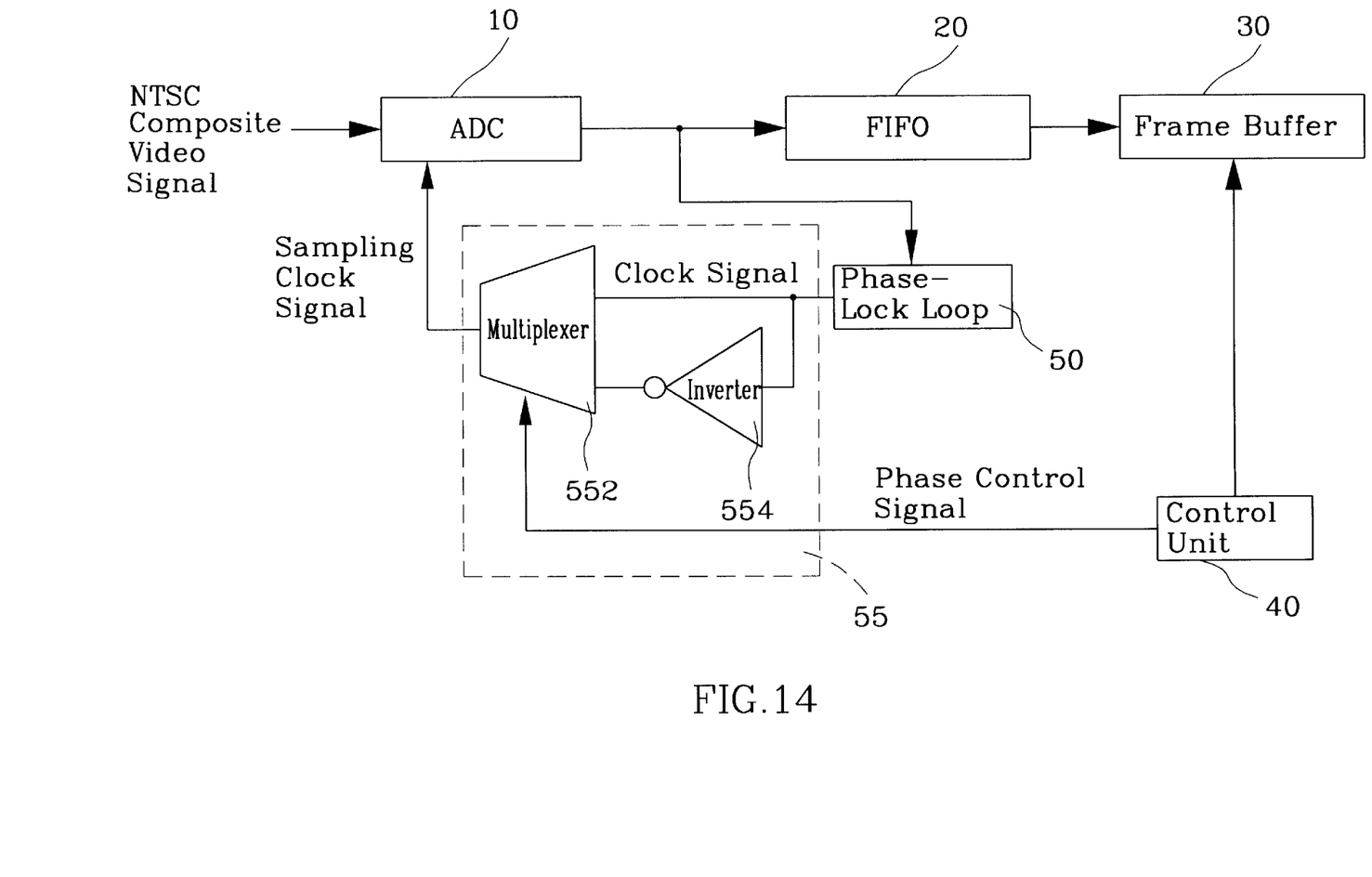
FIG. 14 is a block diagram showing an embodiment of achieving double resolution.

It is therefore an object of the present invention to employ the circuit of FIG. 14 to double the sampling of the luminance component of a video signal. Compared with the embodiment of this invention shown in FIG. 2, the embodiment of FIG. 14 further includes a double sampling circuit 55. Double sampling circuit 55 comprises a multiplexer 552 and an inverter 554. The clock signal generated by PLL 50 is coupled to multiplexer 552 and inverter 554 to concurrently provide sampling clock signal (SCLK). SCLK inverted by inverter 554 is connected to one input terminal of multiplexer 552. Another input terminal of multiplexer 552 is coupled to control unit 40 which conditions multiplexer 552 to output sampling clock signal of positive and negative phase to ADC 10 for video signal sampling with a sampling frequency of 14.318 MHz. Thus as the luminance component of a video signal is double sampled, the overall resolution of an image is increased.

Figure 15:
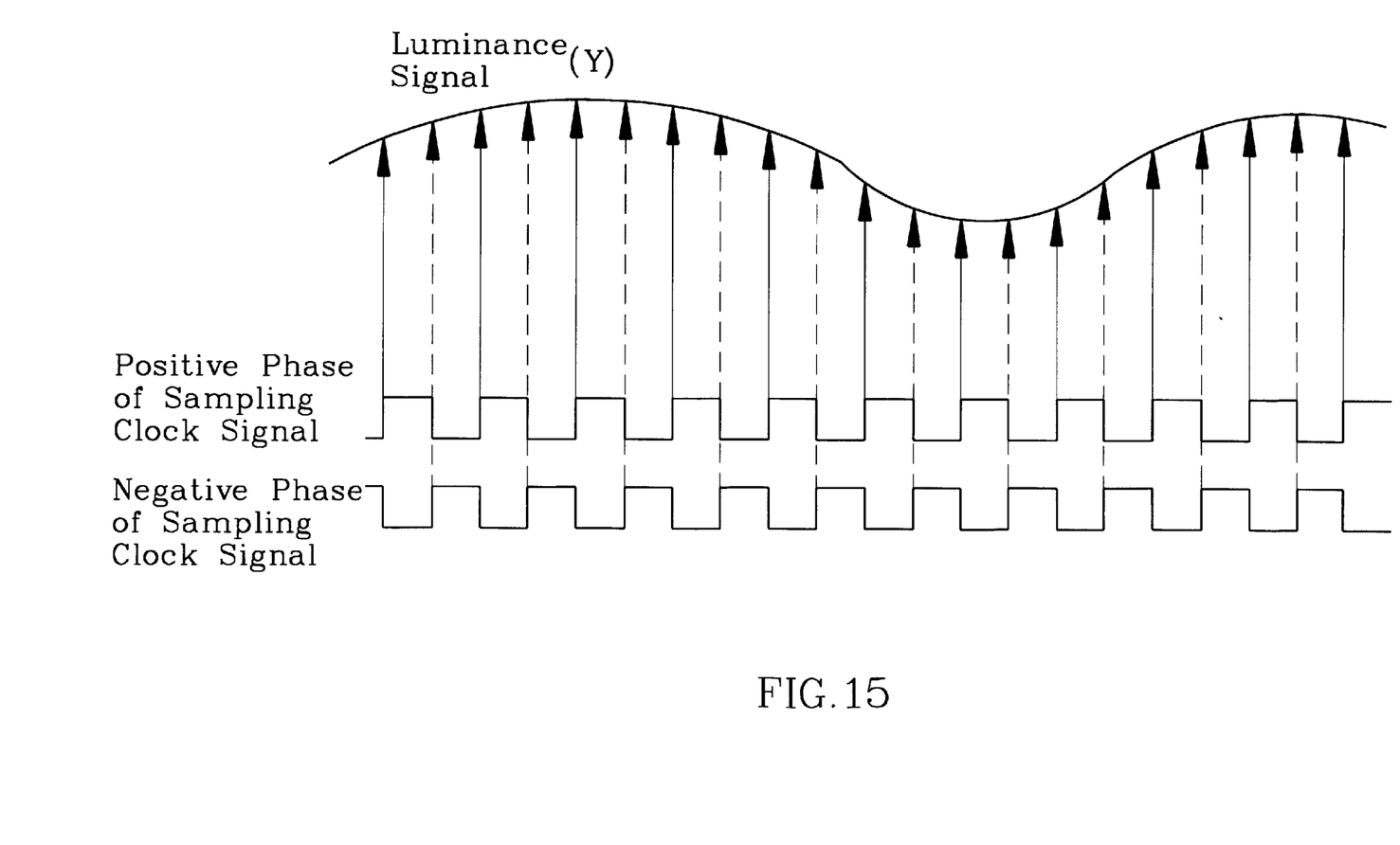
FIG. 15 is a waveform showing the timing of sampling luminance signal.

FIG. 15 is a waveform showing the luminance component (Y) of a video signal sampled according to sampling clock signal provided by double sampling circuit 55 of FIG. 14. Control unit 40 conditions double sampling circuit 55 to output two sampling clock signals of opposite phases. ADC 10 samples signal at the rising edge of one sampling clock signal, as indicated by solid arrow, and then at the rising edge of another sampling clock signal, as indicated by the dashed arrow, alternately. Thus the sampling frequency is doubled.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A video signal processing apparatus connectable to a personal computer for processing an analog NTSC composite video signal, said apparatus comprising:

an analog to digital converter for converting said analog NTSC composite video signal into a digital signal represented in a binary form;

a phase-locked loop connected to said analog to digital converter to form a feed back loop, said phase-locked loop generating a sampling clock signal having a frequency multiple-time of a color burst signal and in phase the color burst signal, and transmitting said sampling clock signal to said analog to digital converter;

a first-in-first-out buffer coupled to said analog to digital converter for sequentially storing said digital signal converted by said analog to digital converter;

a frame buffer with a predetermined capacity of multiple frames of digital video signal, connected to said first-in-first-out buffer;

a control unit for providing said frame buffer and said first-in-first-out buffer timing signal, an output terminal of said control unit connected to the phase-locked loop for controlling the phase of the sampling clock signal; and a printer port interface connected to said frame buffer for transmission of said video signal and control signal from said video signal processing apparatus to said personal computer.

2. The video signal processing apparatus set forth in claim 1, wherein said phase-locked loop includes:

a phase comparator for comparing the phases of two sampling video signals; and, a phase error table generating a phase error signal according to the comparison result of said phase comparator, by looking into a predefined table.

3. The video signal processing apparatus set forth in claim 2 further comprising:

a low pass filter which generates a sampling clock signal by integrating the phase error signal supplied by said phase error table; and, a voltage-controlled oscillator generating a sampling clock signal by transforming voltage.

4. The video signal processing apparatus set forth in claim 3, further comprising:

an inverter which inverts the phases generated by said phase-locked loop; and, a multiplexer which multiplexes the phases generated by said phase-locked loop and said inverter for a double sampling signal.

5. The video signal processing apparatus set forth in claim 2, wherein said phase comparator includes:

a $2^{nd}$ register whose output is designated as n2, said $2^{nd}$ register storing the last sampling video signal of three sampling video signals in sequence;

a $1^{st}$ register whose output is designated as n1, said $1^{nd}$ register storing the second sampling video signal of three sampling video signals in sequence;

a $0^{th}$ register whose output is designated as n0, said $0^{th}$ register storing the first sampling video signal of three sampling video signals in sequence;

a $1^{st}$ comparator with input terminal connected to said $0^{th}$ register and said $1^{st}$ register, comparing said n0 and n1;

a $2^{nd}$ comparator with input terminal connected to said $1^{th}$ register and said $2^{st}$ register, comparing said n1 and n2;

a XOR gate coupled to the outputs of said $1^{st}$ comparator and said $2^{nd}$ comparator, responsive to the comparison result exclusively, and generating a signal for controlling the output of said phase error signal;

a subtractor which generates said phase error signal according to the result of n2-n0.

6. The video signal processing apparatus set forth in claim 5, wherein said phase comparator generates comparison result according to the following conditions:

condition I: (when n1<n0 and n1<n2, the sine wave of color burst signal falling in negative phase)

a. in case of n2>n0, a condition indicating that the phase of sampling clock signal lags, and the sampling frequency required to be increased;

b. in case of n2<n0, a condition indicating that the phase of sampling clock signal leads, and the sampling frequency required to be decreased;

condition II: (when n1>n0 and n1>n2, the sine wave of color burst signal falling in positive phase)

c. in case of n2>n0, a condition indicating that the phase of sampling clock signal leads, and the sampling frequency required to be decreased;

d. in case of n2<n0, a condition indicating that the phase of sampling clock signal lags, and the sampling frequency required to be increased.

7. The video signal processing apparatus set forth in claim 5, wherein said comb filter includes:

a frame buffer for storing said NTSC composite video signal which includes a luminance component signal Y, and a chrominance component U and V representing a (B-Y) color difference signal and a (R-Y) color difference signal respectively;

a $1^{st}$ subtractor coupled to said frame buffer and said composite video signal, substracting a sampled signal of the same location;

a multiplier which generates a color signal C by multiplying the output of said $1^{st}$ subtractor by ½ to obtain the color difference U or V of each pixel; and, a $2^{nd}$ subtractor which subtracts each sampled signal by color signal C to obtain luminance signal Y, and thus achieving the separation of Y and C.

8. The video signal processing apparatus set forth in claim 1 further comprising a comb filter for separating said digital video signal into a chrominance component signal and a luminance component signal.

9. The video signal processing apparatus set forth in claim 8, wherein said comb filter includes:

a frame buffer for storing said NTSC composite video signal which includes a luminance component signal Y, and a chrominance component U and V representing a (B-Y) color difference signal and a (R-Y) color difference signal respectively;

a $1^{st}$ subtractor coupled to said frame buffer and said composite video signal, substracting a sampled signal of the same location;

a multiplier which generates a color signal C by multiplying the output of said subtractor by ½ to obtain the color difference U or V of each pixel; and, a $2^{nd}$ subtractor which generates said luminance component signal Y by subtracting each said NTSC composite video signal from said frame buffer by said color signal C.

10. A phase-locked loop which can be implemented in an apparatus for controlling the sampling phases of video signal and stabling output frequency, said phase-locked loop includes:
- a phase comparator for comparing the phases of two sampling video signals;
- a phase error table generating a phase error signal according to the comparison result of said phase comparator, by looking into a predefined table;
- a low pass filter connected to said phase error table in cascade, reduce the ripple component of said phase-error signal by integration;
- a voltage-controlled oscillator connected to said low pass filter in cascade, to generate a sampling clock signal by voltage change.

11. The phase-locked loop set forth in claim 10, wherein said phase comparator includes:
- a $1^{st}$ register whose output is designated as n1, said $1^{nd}$ register storing the second sampling video signal of three sampling video signals in sequence;
- a $0^{th}$ register whose output is designated as n0, said $0^{th}$ register storing the first sampling video signal of three sampling video signals in sequence;
- a $1^{st}$ comparator with input terminal connected to said $0^{th}$ register and said $1^{st}$ register, comparing said n0 and n1;
- a $2^{nd}$ comparator with input terminal connected to said $1^{th}$ register and said $2^{st}$ register, comparing said n1 and n2;
- a XOR gate coupled to the outputs of said $1^{st}$ comparator and said $2^{nd}$ comparator, responsive to the comparison result exclusively, and generating a signal for controlling the output of said phase error signal;
- a subtractor which generates said phase error signal according to the result of n2-n0.

12. The phase-locked loop set forth in claim 10, further comprising a comb filter which process video signals in a three-dimensional way, by including the time domain into the processing in addition to X axis and Y axis, to avoid false color at the edge of image.

13. The comb filter set forth in claim 12, including:
- a frame buffer for storing an NTSC composite video signal which includes a luminance component signal Y, and a chrominance component U and V representing a (B-Y) color difference signal and a (R-Y) color difference signal respectively;
- a $1^{st}$ subtractor coupled to said frame buffer and said composite video signal, substracting a sampled signal of the same location;
- a multiplier which generates a color signal C by multiplying the output of said $1^{st}$ subtractor by ½ to obtain the color difference U or V of each pixel; and,
- a $2^{nd}$ subtractor which subtracts each sampled signal by color signal C to obtain luminance signal Y, and thus achieving the separation of Y and C.

14. The phase-locked loop set forth in claim 10, further including a double resolution circuit for providing a static image with double resolution, by double sampling the luminance component Y of a video signal, said double resolution circuit connected between a phase-locked loop and an analog to digital converter.

15. The double resolution circuit set forth in claim 14, comprising
- an inverter which inverts the phases generated by said phase-locked loop;
- a multiplexer which multiplexes the phases generated by said phase-locked loop and said inverter for a double sampling signal.

* * * * *